(12) United States Patent
Kaithakapuzha

(10) Patent No.: US 7,469,067 B2
(45) Date of Patent: Dec. 23, 2008

(54) SEQUENTIAL DECODING OF PROGRESSIVE CODED JPEGS

(75) Inventor: Sukesh V. Kaithakapuzha, Fremont, CA (US)

(73) Assignee: Magnum Semiconductor, Inc., Milpitas, CA (US)

( * ) Notice: Subject to any disclaimer, the term of this patent is extended or adjusted under 35 U.S.C. 154(b) by 887 days.

(21) Appl. No.: 10/980,250

(22) Filed: Nov. 4, 2004

(65) Prior Publication Data

US 2006/0008161 A1 Jan. 12, 2006

Related U.S. Application Data

(60) Provisional application No. 60/585,072, filed on Jul. 6, 2004.

(51) Int. Cl.
*G06K 9/36* (2006.01)
*G06F 13/00* (2006.01)
*G06K 9/46* (2006.01)

(52) U.S. Cl. ........................ 382/233; 345/560

(58) Field of Classification Search ................. 382/162, 382/164, 171, 173, 232, 233, 239, 246, 250, 382/251, 253, 305, 310; 375/240.03, 240.2, 375/240.25, 245; 714/789, 791, 793; 345/419, 345/424, 445, 560

See application file for complete search history.

(56) References Cited

U.S. PATENT DOCUMENTS 3,665,396 A * 5/1972 Forney, Jr. ................. 714/789
5,136,371 A * 8/1992 Savatier et al. ......... 375/240.05
6,084,637 A * 7/2000 Oku et al. ................... 348/445
6,175,650 B1 * 1/2001 Sindhu et al. ............... 382/171
6,252,994 B1 * 6/2001 Nafarieh ..................... 382/253
7,092,578 B2 * 8/2006 Kakarala et al. ............ 382/251
2005/0195191 A1 * 9/2005 Lee et al. .................... 345/424
2006/0008161 A1 * 1/2006 Kaithakapuzha ............ 382/233

OTHER PUBLICATIONS

International Telecommunication union, CCITT, "Terminal Equipment and Protocols for Telematic Services, Information Technology—Digital Compression and Coding of Continuous-Tone Still IMages—Requirement and Guidelines", Recommendation T.81 (Sep. 1992).

* cited by examiner

*Primary Examiner*—Amir Alavi
(74) *Attorney, Agent, or Firm*—Robert Platt Bell; Maryam Imam

(57) ABSTRACT

Progressive scan encoded JPEGS are decoded sequentially on a Minimum Coded Unit (MCU) basis and then the JPEG image is output one row at a time to a frame buffer. Since the entire image does not need to be decoded at once, a huge JPEG buffer is generally not required. The present invention reconstructs each MCU one scan at a time to produce complete lines of image data and thus provides an output using the image data on a line-by-line basis. This technique may require that each MCU be reconstructed scan-by-scan. This technique provides a modified entropy (Huffman) decoder in which data for different scans of an MCU of the progressively scanned JPEG image may be stored in a buffer, and a parsing and scan table element creates pointers to the memory buffer corresponding to the start of each scan level. Scan tables are also extracted for each level of scan or points to the same tables if some scan levels use the same table.

24 Claims, 5 Drawing Sheets

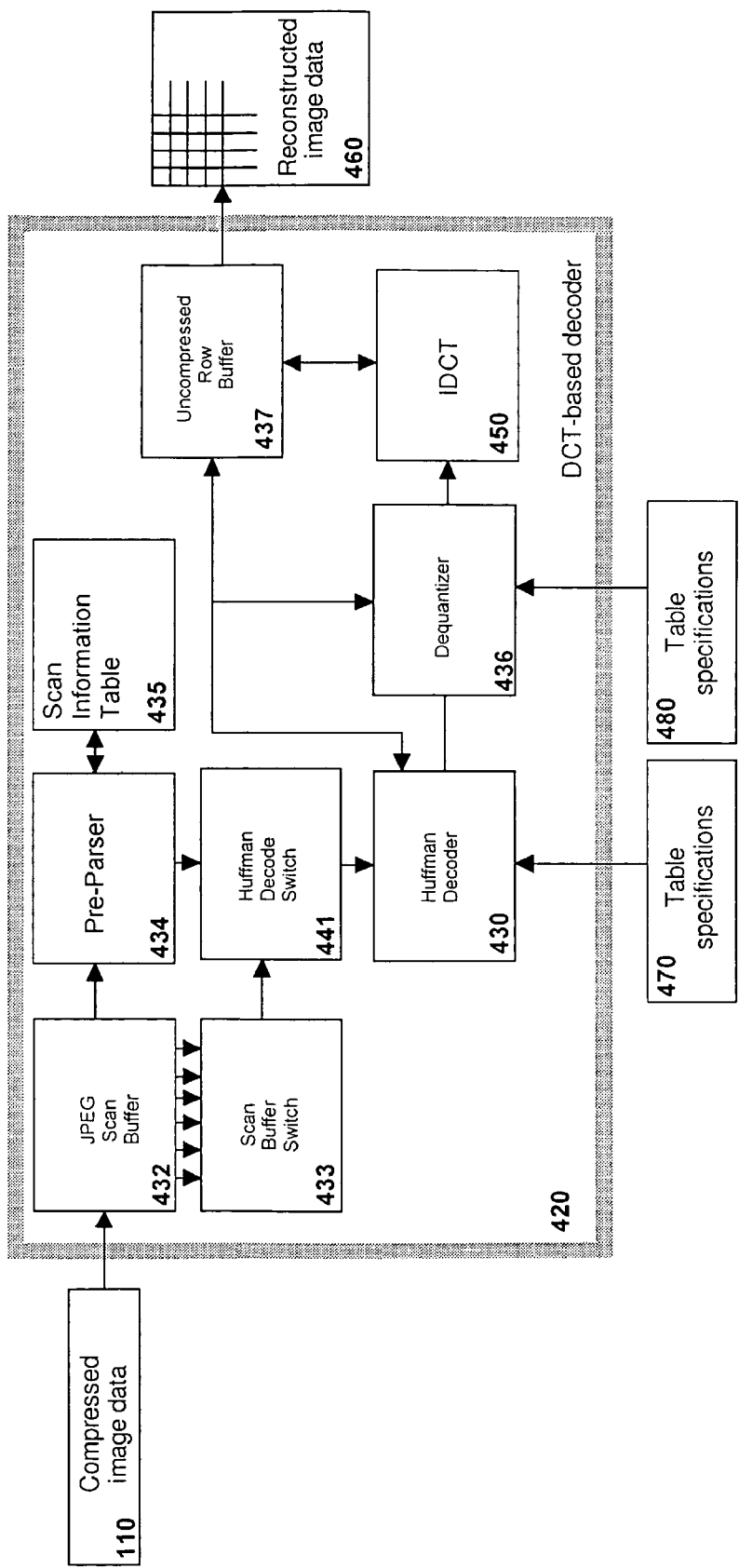

SEQUENTIAL DECODING OF PROGRESSIVE CODED JPEGS

CROSS-REFERENCE TO RELATED APPLICATIONS

The present application claims priority from Provisional U.S. Patent Application No. 60/585,072 filed on Jul. 6, 2004, and incorporated herein by reference.

FIELD OF THE INVENTION

The present invention relates to a method and apparatus for allowing JPEG images to be displayed on a DVD player. In particular, the present invention provides a technique whereby progressively encoded Joint Photographic Experts Group (JPEG) images may be sequentially decoded.

BACKGROUND OF THE INVENTION

The present invention relates to a method and apparatus for allowing JPEG images to be displayed on a DVD player. In particular, the present invention provides a technique whereby progressively encoded JPEG images may be sequentially decoded. This feature is desirable, as many consumers are switching to digital cameras and storing large numbers of JPEG images on DVDs or CD-ROMS. These discs can be mailed to family and friends, or can be played back on a DVD player to create a slide show for neighbors and guests.

A DVD player can be designed to read these JPEG files, display the images on a TV screen, and navigate the images using a simple user interface via the DVD player remote control. One problem in enabling such a feature is that JPEG images may be encoded in one of two formats: progressive and sequential scan formats. FIG. 1A illustrates the gradual fade-in effect of a progressive scan JPEG image as it is rendered on a display. FIG. 1B illustrates the line-by-line construction of a sequential scan JPEG image as it is rendered on a display.

Referring to FIG. 1B, sequential scan JPEG images are decoded one line or row at a time, and during the decoding process, each successive line may be displayed as it is decoded. Since the television display displays scan lines in a similar manner (from top to bottom), displaying sequential scan encoded JPEGs is not difficult to accomplish and does not require very intensive processing or large amounts of buffer memory. As each line or row is decoded sequentially, only a one or two row buffer(s) are required. Once a row of data is decoded, the row may be transferred into the existing DVD frame buffer and the next two lines decoded.

In FIG. 1B, the three successive views illustrate how the image is drawn on a display, one row at a time. Each of the three successive views in FIG. 1B represent how the image may look at arbitrary successive times during the drawing process, as the image is drawn from top to bottom. As the name implies, the sequential JPEG is drawn sequentially in a continuous process.

On the other hand, progressive scan encoded JPEG images decode the image one scan or layer at a time, so that the image appears faint and out of focus initially, and then slowly improves in resolution, as illustrated in FIG. 1A. Progressive scan JPEGs allow a user to see what the image is all about while it is being decoded. Unlike the images in FIG. 1B, the three scans in FIG. 1A, Scan1, Scan2, Scan3, represent distinct scan operations, whereby the image is reproduced, first as a faint fuzzy image (Scan1) then coming into focus (Scan2) until the complete imaged appears (Scan3). This progressive scan technique uses layers of scans to create an image progressively. Although three scans are illustrated here, other numbers of scans may be used in a progressive scan JPEG image.

In the era of dialup modems, the progressive scan JPEG is more useful, as a user might not want to wait for a 2 MB image to download from the Internet only to discover the image was not the one they were looking for. Of course, today, with high-speed connections available, the need for progressive scan may be questionable, as a JPEG image may appear almost instantaneously (regardless of scan type). Today, most images are encoded using sequential scan JPEG encoding.

Regardless, however, in order to provide complete JPEG support in a DVD player, a manufacturer should support both JPEG types, as both are part of the JPEG standard and consumers may wish to display images that are progressive scan encoded. Thus, a DVD player manufacturer should provide support for both types of JPEGs if they want to advertise full JPEG compatibility for their DVD player. The JPEG standard is set forth in more detail in International Telecommunication Union CCITT T.81 ISO/IEC 10918-1 1993-E (September 1992) "TERMINAL EQUIPMENT AND PROTOCOLS FOR TELEMATIC SERVICES, INFORMATION TECHNOLOGY—DIGITAL COMPRESSION AND CODING OF CONTINUOUS-TONE STILL IMAGES—REQUIREMENTS AND GUIDELINES, Recommendation T.81", incorporated herein by reference in its entirety.

The problem with progressive scan encoded images, is that in the Prior Art, a huge buffer was required to decode the image using conventional techniques, such as the standard software described in the JPEG standard incorporated by reference above. The buffer would have to store scan data for the entire image, and thus an image-sized buffer (memory space) was required to decode progressive scan JPEG images.

On a home PC, memory buffer may not be an issue, as memory (RAM or drive space) is readily available, and reducing the number of processor operations was (at least historically) more of a priority. However, for a consumer DVD player, such memory requirements may be a bit more onerous. A 1024×1024 buffer that is used only for JPEG decoding is not all efficient use of resources. In a consumer DVD player, trading off memory requirements for processor operations may be preferable.

In the Prior Art, most manufacturers bit the bullet and installed a large JPEG decoding buffer to decode the progressive scan JPEGS. This solution adds to the expense of the overall design, as a larger SRAM is required. Also, this large buffer takes away memory available for other applications in the system.

FIG. 2 is a block diagram of a Prior Art progressive scan encoder 220 as set forth in the ISO/IEC 10918-1 1993-E document previously incorporated by reference. FIG. 2 illustrates the main procedures for all encoding processes based on a Discrete Cosine Transform (DCT). In the prior encoding process, the samples of input source image data 160 may be grouped, for example, into 8×8 pixel blocks known as Minimum Coded Units (MCU), and each block may then be transformed by the forward DCT (FDCT) 250 into a set of 64 values referred to as DCT coefficients. One of these values is referred to as the DC coefficient and the other 63 as the AC coefficients. Each of the 64 coefficients is then quantized in quantizer 240 using one of 64 corresponding values from a quantization table 170.

After quantization, the DC coefficient and the 63 AC coefficients are prepared for entropy encoding in entropy encoder 230. FIG. 1C illustrates how difference encoding may be used on the DC values. The previous quantized DC coefficient is used to predict the current quantized DC coefficient, and the difference is encoded. The 63 quantized AC coefficients undergo no such differential encoding, but are converted into a one-dimensional zig-zag sequence, which is illustrated in FIG. 1D and described in more detail in the ISO/IEC 10918-1 specification previously incorporated by reference.

The quantized coefficients are then passed to an entropy encoder 230, which compresses the data further. One of two entropy coding procedures can be used. If Huffman encoding is used, Huffman table specifications 180 may be provided to the encoder. If arithmetic encoding is used, arithmetic coding conditioning table specifications 180 may be provided. Otherwise, default conditioning table specifications 180 may be used. Entropy encoder 230 outputs compressed image data 110 which may be in the form of a progressive scan JPEG image file.

FIG. 3 illustrates the main procedures for all DCT-based decoding processes. Each step shown performs essentially the inverse of the corresponding procedure of the encoder of FIG. 2 as discussed above. Encoded (compressed) image data 110 is fed to the DCT based decoder 320. Entropy (Huffman) decoder 330 decodes the zig-zag sequence of quantized DCT coefficients. After dequantization in dequantizer 340, the DCT coefficients are transformed to an 8×8 block of samples by the inverse DCT (IDCT) 350 to produce the reconstructed image data 360.

The MCU (Minimum Coded Unit) may comprise a number of blocks from each component present in the image. The number of blocks from each component in a MCU may be decided based on the component ratio in the image (e.g., the ratio between luminance Y components and chrominance difference U,V components). In a worst-case scenario, the number of blocks may be 4×4 groups of blocks (the top two pixels in one row and the bottom two pixels in a next row) for each component in the image. Since the Huffman decoding scheme does not decode from a block, which is in the middle of an MCU, but rather from the start of MCU blocks, then it is easier to decode the MCU once and place the data in the two rows of the buffer. The use of a single row buffer is possible, but would require that each MCU be decoded twice. However, the process is already processor intensive as it is.

SUMMARY OF THE INVENTION

The present invention solves this problem by decoding progressive scan encoded JPEGS sequentially and then outputting the JPEG image one row at a time to the frame buffer. Since the entire image need not be decoded at once, a huge JPEG buffer is not required. The technique for performing this process is somewhat processor intensive, as the progressive scan encoding is not really designed for a row-by-row decoding. However, the technique eliminates the need for a large dedicated buffer for progressive scan decoding.

Whereas a Prior Art progressive scan JPEG decoder would reconstruct the image one scan at a time, the present invention reconstructs each MCU one scan at a time to produce complete lines of image data for output, and thus can output the image on a line-by-line basis. This technique may require that each MCU be reconstructed scan-by-scan, which is more processor intensive. However, a complete buffer for the entire image is no longer required.

To achieve this technique, the present invention provides a modified entropy (Huffman) decoder where data for different scans of an MCU of the progressively scanned JPEG image may be stored in a buffer, and a parsing and scan table element creates pointers to the memory buffer corresponding to the start of each scan level. Scan tables are also extracted for each level of scan (or points to the same tables if some scan levels use the same table).

Each MCU is then decoded starting with the DC scan (e.g., scan0), which may be the DC value from the DCT transform. Once a scan is completed on an MCU, the pointer is offset to the next scan level and the same MCU is then further decoded using the next scan level. The process is repeated for all scan levels (e.g., scan0 through scan5 for a six-scan image) until the MCU is decoded. The MCU data is then stored in the two (8×8 block) row buffer and the next MCU decoded using the same technique.

The image may be suitably processed to conform to the resolution of the display screen (e.g., 720×480 pixels for NTSC video, 720×576 pixels for PAL). Interpolation, filtering, or decimation may be used to fit the image to the output display. Once the two-row buffer is filled with decoded data, the data may be transferred to the frame buffer of the DVD player and the next two rows decoded in a similar fashion by reusing the same row buffer. The process is repeated until the entire JPEG image is decoded.

While this process results in more decoding steps (e.g., scans 0-5 for each MCU, instead of per-forming scans 0-5 for the entire image), it considerably reduces the need for a dedicated image size coefficient buffer.

BRIEF DESCRIPTION OF THE DRAWINGS

FIG. 4 is a block diagram of the progressive scan decoder of the present invention.

DETAILED DESCRIPTION OF THE INVENTION

Progressive JPEG images are designed to be decoded and displayed before the complete image data is available to the decoder as compared to sequential jpeg images. The progressive JPEG allows a user to fully decode a complete scan (normally an image has multiple scans) without any reference to the future scans, thus requiring at least one full image size coefficient buffer (for performing Huffman decoding).

Figure 1A:
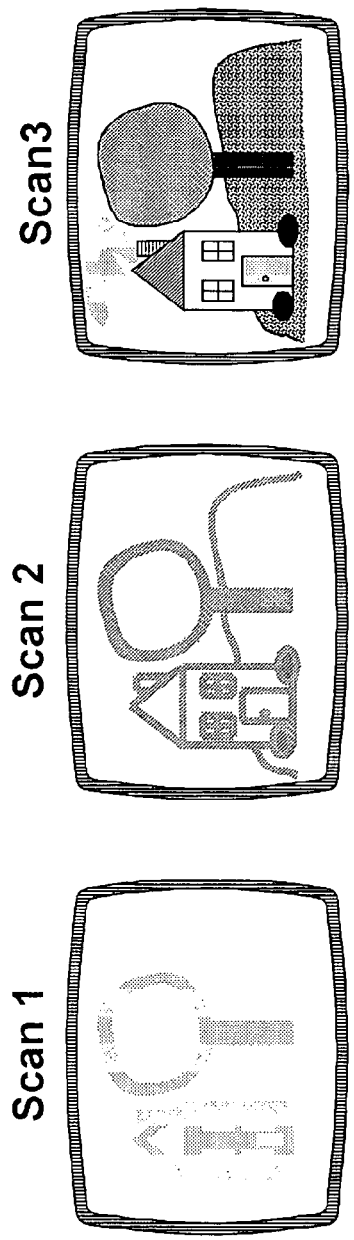
FIG. 1A illustrates the gradual fade-in effect of a progressive scan JPEG image being rendered on a display.
Figure 1B:
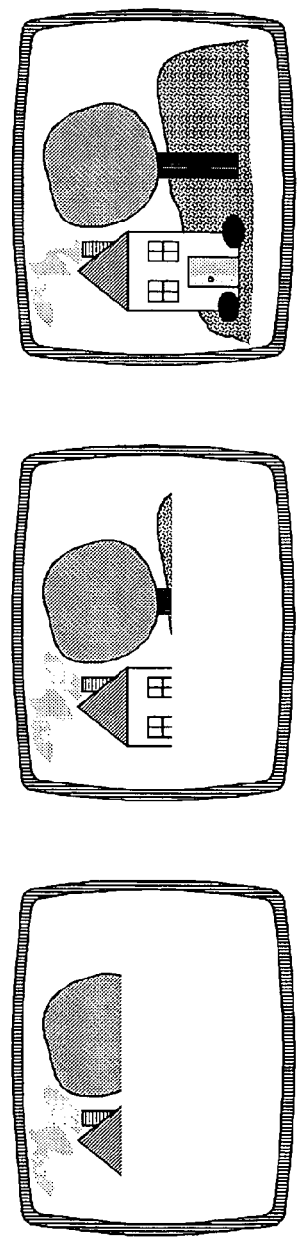
FIG. 1B illustrates the line-by-line construction of a sequential scan JPEG image being rendered on a display.
Figure 1D:
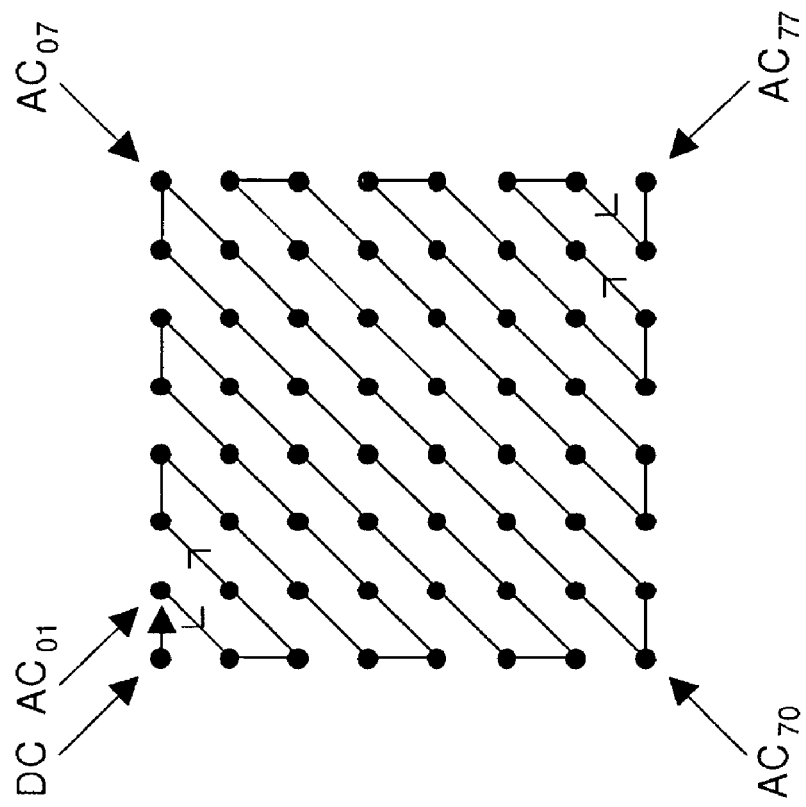
FIG. 1D is a diagram illustrating a one-dimensional zig-zag sequence in which the 63 quantized AC coefficients are converted.
Figure 1C:
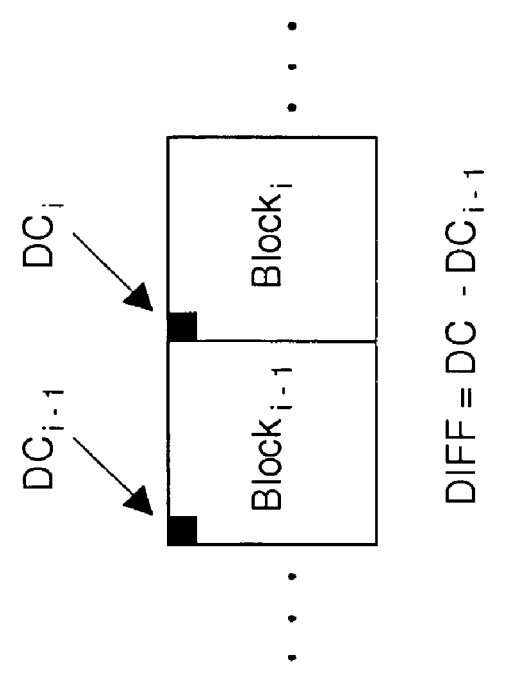
FIG. 1C is a diagram illustrating how difference encoding may be used on the DC values.
Figure 2:
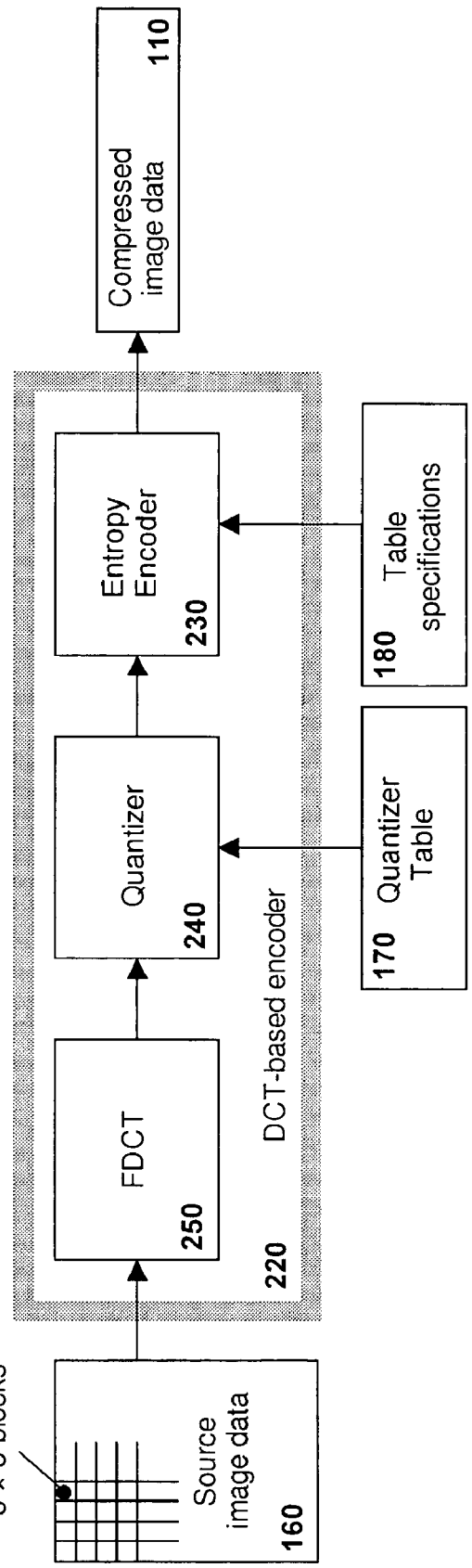
FIG. 2 is a block diagram of a Prior Art progressive scan encoder.
Figure 3:
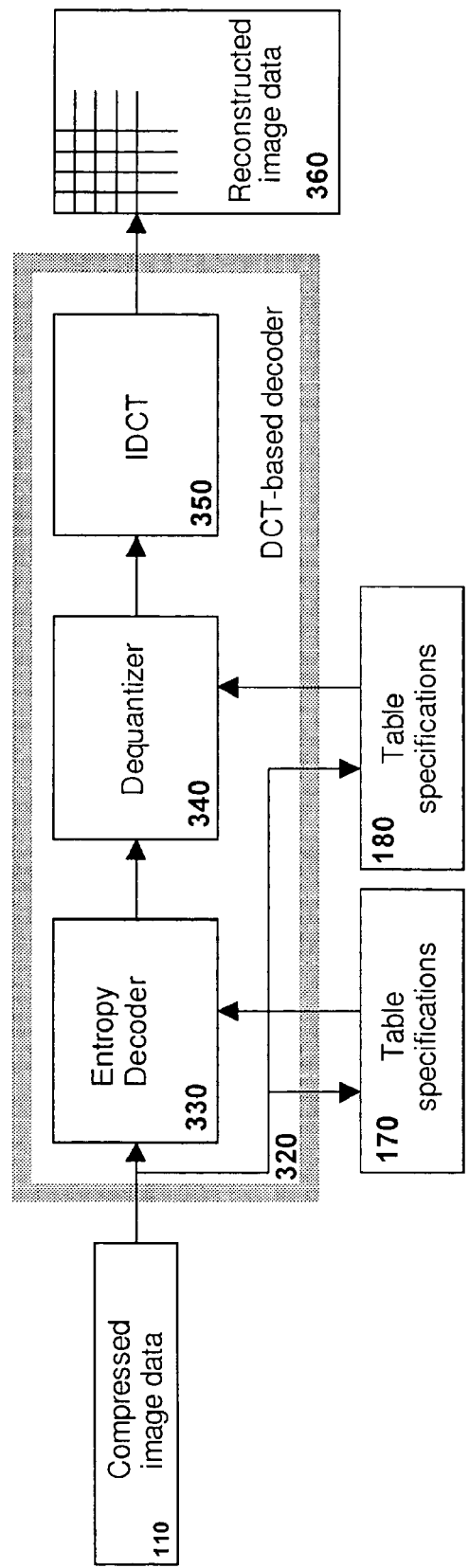
FIG. 3 is a block diagram of a Prior Art progressive scan decoder.

FIG. 4 is a block diagram of the progressive scan decoder of the present invention, in which the requirement of a full image size frame buffer is eliminated. Elements similar to elements in Prior Art FIG. 3 are given similar reference numerals. Encoded, compressed image data 110 is fed to the DCT based decoder 420, in which data may be stored in a JPEG scan buffer 432.

DCT based decoder 420 initially performs a pre-parsing of the image data in pre-parser block 434 and stores this scan information in. This initial pre-parsing is performed to determine different scan offsets (e.g., Scan 0, Scan 1, Scan 2, . . . Scan 5) in the compressed image and also to extract the quantization and Huffman table specifications 470 and 480.

Scan buffer switch 433 is used to select data for different scans within the compressed image data 10. Output from the scan information table 435 and the scan buffer switch 433 is fed to Huffman decode switch 441, which selects individual MCUs for progressive decoding in Huffman decoder 430. The entropy (Huffman) decoder 430 decodes the zig-zag sequence of quantized DCT coefficients.

Data from the decoded MCU is then dequantized in dequantizer 436 and the IDCT performed in IDCT block 450. After dequantization in dequantizer 440, the DCT coefficients are transformed to an 8×8 block of samples by the inverse DCT (IDCT) 450 to produce the reconstructed image data 460. Data from the decoded MCU is then stored in uncompressed row buffer 437. Uncompressed row buffer 437 is allocated dynamically during the pre-parsing process and is shared by different modules in the decompression process. The size of buffer 437 changes from image to image and is calculated as "two 8×8 block row size," that is, two lines of 8×8 blocks and the size of the line is equal to the horizontal resolution of the image (e.g., if image has 480 pixels horizontal and 640 pixels vertical, then buffer 437 is two 60 blocks (8×8), i.e., 480/8=60).

From uncompressed row buffer 437, the reconstructed image data 460 may be output to a frame buffer in the DVD player, on a line by line basis, and displayed in the same manner as a sequential scan JPEG image.

After this initial pre-parsing, the Huffman decoding is performed in Huffman decoder block 430 in an unconventional way. Instead of decoding the image scan by scan, a maximum of two block (8×8) rows from each of the scans are decoded according to the present invention. Then, the two rows of data are dequantized in dequantizer 436 and an inverse DCT performed in IDCT 450 to generate two row's worth of reconstructed image data 460 for display on a screen.

The process is repeated for the next two rows, on an MCU by MCU basis, and so on. This technique basically reduces the decoded image data memory requirement for decoding a progressive JPEG decoder to a maximum of two rows of MCU memory.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An apparatus for decoding and sequentially displaying progressive scan images, comprising:
   a scan buffer for receiving encoded progressive scan image data for a plurality of scan levels for at least one coded unit of the encoded progressive scan image data;
   a pre-parser, coupled to the scan buffer, for parsing the encoded progressive scan image data to create pointers to scan buffer corresponding to the start of each scan level;
   a scan buffer switch, coupled to the scan buffer and the pre-parser, for selectively retrieving scan data for at least one coded unit for a plurality of scan levels;
   a decoder, for decoding the at least one coded unit of the encoded progressive scan image; and
   a row buffer, coupled to the decoder, for storing at least one row of the decoded progressive scan image and for outputting the at least one row of the decoded progressive scan image to display the decoded progressive scan image sequentially.

2. The apparatus of claim 1, further comprising:
   a decoder switch, coupled to the pre-parser and the decoder, for selecting a scan level from the pre-parser, and performing a selected scan level decode on the at least one coded unit of the encoded progressive scan image data.

3. The apparatus of claim 2, further comprising:
   a dequantizer, coupled to the decoder and the row buffer, for dequantizing the decoded progressive scan image data and outputting dequantized progressive scan image data.

4. The apparatus of claim 3, further comprising:
   an inverse discrete cosine transform decoder, coupled to the dequantizer and the row buffer, for performing an inverse discrete cosine transform on the decoded progressive scan image data.

5. The apparatus of claim 4, wherein the decoder comprises a Huffman decoder and the encoded progressive scan image data comprises Huffman encoded progressive scan data.

6. The apparatus of claim 5, wherein the progressive scan image data comprises progressive scan Joint Pictures Experts Group (JPEG) data.

7. A method for decoding and sequentially displaying progressive scan images, comprising:
   receiving in a scan buffer, encoded progressive scan image data for a plurality of scan levels for at least one coded unit of the encoded progressive scan image data,
   parsing, in a pre-parser coupled to the scan buffer, the encoded progressive scan image data to create pointers to scan buffer corresponding to the start of each scan level,
   selectively retrieving scan data for at least one coded unit for a plurality of scan levels,
   decoding the at least one coded unit of the encoded progressive scan image, and
   outputting at least one row of the decoded progressive scan image to display the decoded progressive scan image sequentially.

8. The method of claim 7, further comprising:
   selecting a scan level from the pre-parser and performing a selected scan level decode on the at lease one coded unit of the encoded progressive scan image data.

9. The method of claim 8, further comprising:
   dequantizing the decoded progressive scan image data and outputting dequantized progressive scan image data.

10. The method of claim 9, further comprising:
    performing an inverse discrete cosine transform on the decoded progressive scan image data.

11. The method of claim 10, wherein the step of decoding comprises Huffman decoding and the encoded progressive scan image data comprises Huffman encoded progressive scan data.

12. The method of claim 11, wherein the progressive scan image data comprises progressive scan Joint Pictures Experts Group (JPEG) data.

13. A DVD player capable of decoding and sequentially displaying progressive scan images stored on DVDs, the DVD player comprising:
    a DVD input, for retrieving data from a DVD player;
    a scan buffer, coupled to the DVD input, for receiving encoded progressive scan image data for a plurality of scan levels for at least one coded unit of the encoded progressive scan image data;
    a pre-parser, coupled to the scan buffer, for parsing the encoded progressive scan image data to create pointers to scan buffer corresponding to the start of each scan level;
    a scan buffer switch, coupled to the scan buffer and the pre-parser, for selectively retrieving scan data for at least one coded unit for a plurality of scan levels;

a decoder, for decoding the at least one coded unit of the encoded progressive scan image; and a row buffer, coupled to the decoder, for storing at least one row of the decoded progressive scan image and for outputting the at least one row of the decoded progressive scan image to display the decoded progressive scan image sequentially.

14. The DVD player of claim 13, further comprising:

a decoder switch, coupled to the pre-parser and the decoder, for selecting a scan level from the pre-parser, and performing a selected scan level decode on the at lease one coded unit of the encoded progressive scan image data.

15. The DVD player of claim 14, further comprising:

a dequantizer, coupled to the decoder and the row buffer, for dequantizing the decoded progressive scan image data and outputting dequantized progressive scan image data.

16. The DVD player of claim 15, further comprising:

an inverse discrete cosine transform decoder, coupled to the dequantizer and the row buffer, for performing an inverse discrete cosine transform on the decoded progressive scan image data.

17. The DVD player of claim 16, wherein the decoder comprises a Huffman decoder and the encoded progressive scan image data comprises Huffman encoded progressive scan data.

18. The DVD player of claim 17, wherein the progressive scan image data comprises progressive scan Joint Pictures Experts Group (JPEG) data.

19. A media player chip for use in a media player for decoding and sequentially displaying progressive scan images, the media player chip including:

a scan buffer for receiving encoded progressive scan image data for a plurality of scan levels for at least one coded unit of the encoded progressive scan image data;

a pre-parser, coupled to the scan buffer, for parsing the encoded progressive scan image data to create pointers to scan buffer corresponding to the start of each scan level;

a scan buffer switch, coupled to the scan buffer and the pre-parser, for selectively retrieving scan data for at least one coded unit for a plurality of scan levels;

a decoder, for decoding the at least one coded unit of the encoded progressive scan image; and a row buffer, coupled to the decoder, for storing at least one row of the decoded progressive scan image and for outputting the at least one row of the decoded progressive scan image to display the decoded progressive scan image sequentially.

20. The media player chip of claim 19, further comprising:

a decoder switch, coupled to the pre-parser and the decoder, for selecting a scan level from the pre-parser, and performing a selected scan level decode on the at least one coded unit of the encoded progressive scan image data.

21. The media player chip of claim 20, further comprising:

a dequantizer, coupled to the decoder and the row buffer, for dequantizing the decoded progressive scan image data and outputting dequantized progressive scan image data.

22. The media player chip of claim 21, further comprising:

an inverse discrete cosine transform decoder, coupled to the dequantizer and the row buffer, for performing an inverse discrete cosine transform on the decoded progressive scan image data.

23. The media player chip of claim 22, wherein the decoder comprises a Huffman decoder and the encoded progressive scan image data comprises Huffman encoded progressive scan data.

24. The media player chip of claim 23, wherein the progressive scan image data comprises progressive scan Joint Pictures Experts Group (JPEG) data.

* * * * *